(12) United States Patent
Johnson et al.

(10) Patent No.: US 7,216,454 B2
(45) Date of Patent: May 15, 2007

(54) OPEN-ENDED FISHING RIG KEEPER AND METHOD

(76) Inventors: Diane Johnson, 2 Bear Dr., Oak Ridge, NJ (US) 07438; Steven Kokai, 15 Crest Dr., Long Valley, NJ (US) 07853

( * ) Notice: Subject to any disclaimer, the term of this patent is extended or adjusted under 35 U.S.C. 154(b) by 0 days.

(21) Appl. No.: 11/335,830

(22) Filed: Jan. 20, 2006

(65) Prior Publication Data
US 2006/0168873 A1 Aug. 3, 2006

Related U.S. Application Data

(60) Provisional application No. 60/593,619, filed on Jan. 28, 2005.

(51) Int. Cl.
*A01K 97/06* (2006.01)
(52) U.S. Cl. ....................................................... 43/25.2
(58) Field of Classification Search ................ 43/25.2; D22/139; 24/908
See application file for complete search history.

(56) References Cited

U.S. PATENT DOCUMENTS

| | | | | |
|---|---|---|---|---|
| 468,227 A | * | 2/1892 | Pflueger | 43/25.2 |
| 1,662,983 A | * | 3/1928 | Pflueger | 43/25.2 |
| 2,546,222 A | * | 3/1951 | Funk | 43/25.2 |
| 2,833,075 A | * | 5/1958 | Herron | 43/25.2 |
| 3,354,523 A | * | 11/1967 | Roche et al. | 24/601.8 |
| 3,760,468 A | * | 9/1973 | Linville | 24/601.8 |
| 3,763,589 A | * | 10/1973 | Werner | 43/25.2 |
| D405,153 S | * | 2/1999 | Henry | D22/139 |
| 6,023,877 A | * | 2/2000 | Mueller et al. | 43/43.1 |
| 6,408,563 B1 | * | 6/2002 | Van Scoy | 43/25.2 |

* cited by examiner

*Primary Examiner*—Kurt Rowan
(74) *Attorney, Agent, or Firm*—Thomas J. Germinario

(57) ABSTRACT

A keeper for securing various configurations of rigged fishing line comprises a doubled strand of rigid wire bent into a form which allows a fixed end to be secured to a fishing rod blank while an open other end remains open to allow a rigged line to be inserted under it. A method of attaching the keeper to a fishing rod blank aligns it axially with the open end toward the reel seat and applies silicone type or an equivalent waterproof fastener means around the fixed end and the rod blank.

7 Claims, 1 Drawing Sheet

OPEN-ENDED FISHING RIG KEEPER AND METHOD

This application claims the benefit of Provisional Application No. 60/593,619, filed Jan. 28, 2005.

BACKGROUND OF THE INVENTION

One of the problems encountered by fishermen is what to do with a "rigged" fishing line when the rod to which it's attached is not being used. Many conventional fishing rods are equipped with a "hook keeper" located on the rod blank above the reel seat. Such "hook keepers" are typically semi-circular in shape and are attached to the rod blank on both ends. The hook is secured by slipping it through the opening in the "hook keeper."

There are, however, several situations in which the conventional "hook keeper" fails to adequately secure the rigged fishing line. One of these is the so-called "drop-shot" rig, in which a drop-shot weight is secured to the line through a swivel below the hook. When the line is rigged in this manner, the insertion of the hook into a conventional "hook keeper" does not secure the drop-shot weight attached below the hook. In a moving boat, the unsecured drop-shot weight is apt to bounce around and get tangled with the rigs of other fishing rods.

It is therefore desirable to provide a new type of "keeper" designed to secure various configurations of rigged fishing line involving assorted combinations of hooks, swivels, weights, floats and lures. Optimally such a "keeper" would be open on one end, so that the rigged line could be slid under the open end. Such an "open-ended keeper" must be designed to maintain enough downward pressure on the rod blank by the keeper's open end to prevent the rigged line from slipping out again after it has been inserted. On the other hand, the downward pressure of the open keeper end on the rod blank must not be so great as to prevent the rigged line from being manually slid under the open end or to cause the line to be abraded during that procedure.

The present invention answers the aforesaid needs by providing an open-ended fishing rig keeper with a unique geometric configuration. The open-ended rig keeper is also designed to be quickly attached to the rod blank by the fisherman him/herself using silicone tape. Hence, the fisherman does not need to bring his/her rod to a shop to be retrofitted with an open-ended rig keeper.

SUMMARY OF THE INVENTION

The present invention is directed to an open-ended fishing rig keeper useful in securing various configurations of rigged fishing line secured to a rod blank of a fishing rod while the rod is not in use. The keeper comprises a single strand of rigid wire, having a diameter of 1 mm to 3 mm, 3" to 5" in length, which is doubled back on itself through a loop to form a continuous doubled strand of wire 1½" to 2½" in length. In the preferred embodiment, the rigid wire is fabricated of stainless steel coated with gold, chrome or waterproof paint, or of titanium.

The continuous doubled strand of wire comprising the keeper is formed into a fixed end, a horizontal arm, a midpoint, an arched arm, an angled arm, and an open end, which terminates in the loop of the continuous doubled strand of wire. The horizontal arm extends horizontally from the fixed end of the keeper to the midpoint, where it transitions into the arched arm. The arched arm has an ascending segment, a vertex, and a descending segment. The ascending segment of the arched arm extends upward from a horizontal plane defused by the horizontal arm through an angle in the range 20° to 30° to the vertex approximately ⅛" to ¼" above the horizontal plane.

At the vertex, the ascending segment of the arched arm transitions into the descending segment through an angle in the range 110° to 130°. From the vertex, the descending segment of the arched arm extends downward to the horizontal plane, where it transitions into the angled arm. The angled arm extends upwards from the horizontal plane through an angle in the range 40° to 50° to the open end, which it terminates in the loop of the continuous doubled strand of wire approximately ⅛" to ⅛" above the horizontal plane.

The keeper is attached to the rod blank just above a reel seat by means of silicone tape or other waterproof fastening means having sufficient strength and durability. The keeper is placed axially along the rod blank with the open end pointed toward the reel seat. The silicone tape is wrapped around the horizontal arm and the rod blank, thereby securing the former to the latter. In the preferred embodiment, the horizontal arm is scored with multiple transverse grooves to improve the adherence of the silicone tape to the horizontal arm.

The present invention thus provides a single and economical design that fulfills the need for a fishing rig keeper capable of securing a wide variety of rigged fishing line configurations.

DESCRIPTION OF THE INVENTION

Figure 1:
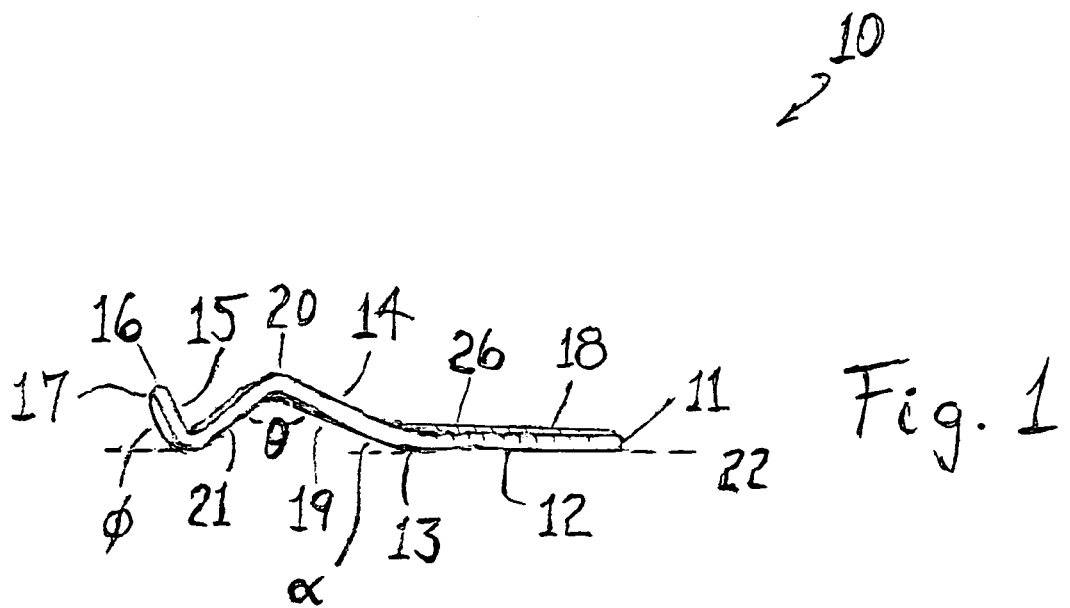
FIG. 1 is a side elevation view of the open-ended fishing rig keeper.
Figure 2:
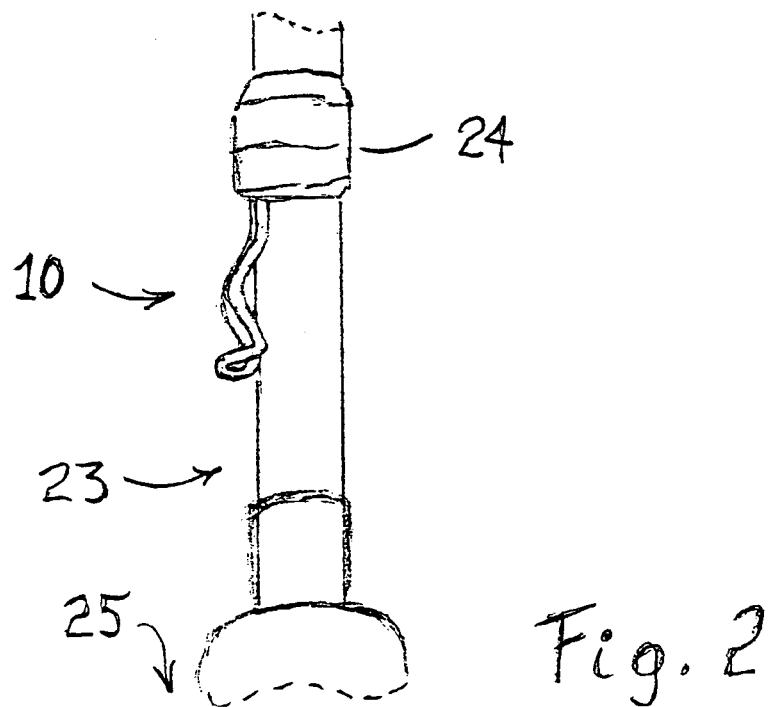
FIG. 2 is a front perspective view of the keeper attached to a fishing rod blank.

The keeper comprises a single strand of rigid wire, having a diameter of 1 mm to 3 mm, 3" to 5" in length, which is doubled back on itself through a loop 17 to form a continuous doubled strand of wire 18 1½" to 2½" in length. In the preferred embodiment, the rigid wire is fabricated of stainless steel coated with gold, chrome or waterproof paint, or of titanium.

The continuous doubled strand of wire comprising the keeper 10 is formed into a fixed end 11, a horizontal arm 12, a midpoint 13, an arched arm 14, an angled arm 15, and an open end 16, which terminates in the loop 17 of the continuous doubled strand of wire 18. The horizontal arm 12 extends horizontally from the fixed end 11 of the keeper 10 to the midpoint, where it transitions into the arched arm 14. The arched arm has an ascending segment 19, a vertex 20, and a descending segment 21. The ascending segment of the arched arm extends upward from a horizontal plane 22 defused by the horizontal arm 12 through an angle $\alpha$ in the range 20° to 30° to the vertex 20 approximately ⅛" to ¼" above the horizontal plane 22.

At the vertex 20, the ascending segment 19 of the arched arm transitions into the descending segment 21 through an angle $\theta$ in the range 110° to 130°. From the vertex 20, the descending segment 21 of the arched arm 14 extends downward to the horizontal plane 22, where it transitions into the angled arm 15. The angled arm 15 extends upwards from the horizontal plane through an angle $\phi$ in the range 40° to 50° to the open end 16, which it terminates in the loop 17 of the continuous doubled strand of wire 18 approximately ⅛" to ¼" above the horizontal plane 22.

The keeper 10 is attached to a rod blank 23 just above a reel seat 25 by means of silicone tape 24 or other waterproof fastening means having sufficient strength and durability. The keeper 10 is placed axially along the rod blank 23 with the open end 16 pointed toward the reel seat 25. The silicone tape 24 is wrapped around the horizontal arm 12 and the rod blank 23, thereby securing the former to the latter. In the preferred embodiment, the horizontal arm 12 is scored with multiple transverse grooves 26 to improve the adherence of the silicone tape 24 to the horizontal arm 12.

The present invention thus provides a single and economical design that fulfills the need for a fishing rig keeper capable of securing a wide variety of rigged fishing line configurations.

While the present invention has been described in some detail with reference to certain currently preferred embodiments, other embodiments are feasible and will readily suggest themselves to those skilled in the art. Therefore, the spirit and scope of the appended claims are not limited to the description of the preferred embodiment contained herein.

What is claimed is:

1. A keeper for securing rigged fishing line to a fishing rod blank, comprising:
   (a) a strand of rigid wire, having a diameter of 1 mm to 3 mm, 3" to 5" in length, doubled back on itself through a loop to form a continuous doubled strand of wire to 3" in length,
   (b) an open end located at the loop of the continuous strand of wire,
   (c) a fixed end located at the terminus of the continuous doubled strand of wire opposite to the loop,
   (d) a midpoint located approximately midway between the open end and the fixed end,
   (e) a horizontal arm extending horizontally from the fixed end to the midpoint,
   (f) a horizontal plane defined by the horizontal arm,
   (g) an angled arm extending upward from the horizontal plane at an angle $\phi$ in the range 40° to 50° to the open end,
   (h) an arched arm extending from the midpoint to the angled arm, which arched arm comprises an ascending segment, a vertex and a descending segment, such that the ascending segment extends upward from the horizontal plane at an angle $\alpha$ in the range 20° to 30° to the vertex approximately ⅛" to ¼" above the horizontal plane, and such that the ascending segment at the vertex transitions into the descending segment through an angle $\theta$ in the range 110° to 130°, and such that the descending segment extends from the vertex down to the horizontal plane, where it transitions into the angled arm.

2. The keeper according to claim 1, wherein the horizontal arm is scored with multiple transverse grooves, thereby allowing the horizontal arm to better adhere to a silicone tape or an equivalent fastening means.

3. The keeper according to claim 1 or 2, wherein the strand of rigid wire is fabricated of stainless steel which is either plated with gold or chrome or coated with waterproof paint.

4. The keeper according to claim 1 or 2, wherein the strand of rigid wire is fabricated of titanium.

5. A method of attaching the keeper described in claim 1 or 2, consisting of placing the keeper axially along a rod blank with the open end pointed toward a reel seat on the rod blank, and wrapping waterproof tape around the horizontal arm and the rod blank, thereby securing the former to the latter.

6. A method of attaching the keeper described in claim 3, consisting of placing the keeper axially along a rod blank with the open end pointed toward a reel seat on the rod blank, and wrapping waterproof tape around the horizontal arm and the rod blank, thereby securing the former to the latter.

7. A method of attaching the keeper described in claim 4, consisting of placing the keeper axially along a rod blank with the open end pointed toward a reel seat on the rod blank, and wrapping waterproof tape around the horizontal arm and the rod blank, thereby securing the former to the latter.

* * * * *